United States Patent [19]

Wojtech et al.

[11] Patent Number: 4,864,065

[45] Date of Patent: Sep. 5, 1989

[54] PROCESS FOR REMOVING HALOGENATED HYDROXYAROMATICS FROM AQUEOUS SOLUTIONS

[75] Inventors: Bernhard Wojtech, Bad Soden am Taunus; Siegbert Rittner, Mörfeldin-Walldorf; Heinz Reiss, Hofheim am Taunus; Reinhard Zunder, Kelkheim (Taunus), all of Fed. Rep. of Germany

[73] Assignee: Hoechst Aktiengesellschaft, Frankfurt am Main, Fed. Rep. of Germany

[21] Appl. No.: 200,838

[22] Filed: Jun. 1, 1988

[30] Foreign Application Priority Data

Jun. 4, 1987 [DE] Fed. Rep. of Germany ....... 3718725

[51] Int. Cl.$^4$ .............................................. C07C 37/68
[52] U.S. Cl. .................................................. 568/155
[58] Field of Search .......................................... 568/755

[56] References Cited

U.S. PATENT DOCUMENTS 4,280,012 7/1981 Pastura et al. ...................... 568/755
4,814,518 3/1989 Gössel et al. ...................... 568/708

FOREIGN PATENT DOCUMENTS 3436349 4/1986 Fed. Rep. of Germany .
101342 9/1974 Japan ................................. 568/755
1118336 6/1986 Japan ................................. 568/755

OTHER PUBLICATIONS

Hwang, S. T., "Treatability of Toxic Wastewater Pollutants by Solvent Extraction", AICHE Symp. Ser., No. 209 77, 304–305 (1981)

Primary Examiner—Werren B. Lone

[57] ABSTRACT

The invention relates to a process for extracting halogenated hydroxyaromatics from aqueous solutions. In this process, the extractant used is an amine salt comprising an aliphatic amine having a total carbon number of 10 to 75 and a strong acid. The amine salt may be employed in undiluted form or diluted with an organic solvent.

13 Claims, No Drawings

PROCESS FOR REMOVING HALOGENATED HYDROXYAROMATICS FROM AQUEOUS SOLUTIONS

DESCRIPTION

Process for removing halogenated hydroxyaromatics from aqueous solutions.

The invention relates to a process for extracting halogenated hydroxyaromatics from aqueous solutions.

It is know that large amounts of waste water which is difficult to purify are produced during the production and further processing of halogenated hydroxyaromatics. Halogenated hydroxyaromatics are used in large amounts as disenfectants and preservatives and are important aromatic intermediates. As a consequence of their bactericidal properties, they have a toxic effect, and, furthermore, they are mostly poorly biodegradable; disposal of such waste water is thus subject to strict regulations by the authorities. If the aromatics are to be removed from such waste water without recovery, a number of proven processes are available in which the contents are destroyed, such as oxidative degradation by ozonization or oxygen treatment, or adsorption on charcoal and subsequent partial or complete combustion. If, however, recovery of the halogenated hydroxyaromatics is worthwhile or required, the separation method should also have the object of substantial waste water purification responding to ecological requirements.

Although exchange processes on resins are effective, the adsorption capacity is limited and regeneration of the exchanger resins is a complex procedure. In addition, the resins are not very specific, and other contents, which are always present in waste water, are also adsorbed and reduce the adsorption capacity and complicate regeneration, or even make it impossible. Due to the boiling point of halogenated hydroxyaromatics, which is above that of water (>140° C.), distillative separation is energetically too expensive.

In contrast, liquid-liquid extraction has proven to be a suitable separation method. The distribution coefficients ($C_D$=concentration of the halogenated hydroxyaromatic in the extractant phase: concentration in the aqueous phase) in customary extractants extend, as shown by the example of 2-chlorophenol in AICHE Symp. Series No. 209, Vol. 77, 305 (1981), from $C_D$=0.7 in the case of nonpolar n-hexane via $C_D$=9 (toluene), $C_D$=130 (n-hexanol), $C_D$=179 (diethyl ether) to $C_D$=200 in the case of the very polar methyl ethyl ketone. However, the advantage of a high $C_D$ value is coupled with the disadvantage of a high water solubility of the extractant. This solubility extends from 23 ppm (n-hexane) via 470 ppm (toluene) to 27.1% by weight in the case of methyl ethyl ketone.

It is known that monohydric and polyhydric, non-halogenated phenols, which are slightly acidic or neutral and sensitive to oxidation, can be extracted using higher amines or, according to German Offenlegungsschrift No. 3,436,349, using salts of higher amines.

Surprisingly, it has now been found that strongly acidic, halogenated hydroxyaromatics can in fact be removed extremely well from waste water by extraction if salts of higher amines are used. With respect to their chemical behavior, it would be expected that the pure amine, i.e. the base, would bind the strongly acidic halogenated hydroxyaromatics substantially more strongly than would the amine salt, such as, for example, the amine sulfate $[(R_3NH)_2]^{2+}[SO_4]^{2-}$ or the amine chloride $[R_3NH]^+[Cl]^-$, which is already slightly acidic, but, surprisingly, this is not the case. The invention therefore relates to a process for extracting halogenated hydroxyaromatics from aqueous solutions, wherein the extractant used is an amine salt which comprises an aliphatic amine having a total carbon number of 10 to 75 and a strong acid, it being possible to employ the amine salt in undiluted form or diluted with an organic solvent.

The amine salt is either prepared separately and then added to the waste water, or formed in situ. For in-situ formation, amine alone is generally added if the waste water already contains sufficient acid, otherwise amine and acid are added.

The aliphatic amines on which the amine salts are based can be primary, secondary or tertiary and should have a total carbon number of 10 to 75, preferably 20 to 50 carbon atoms, and may be straight-chain, cyclic or branched. Of the amines mentioned, tertiary amines, above all tri-noctylamine, tri-isooctylamine, tri-n-decylamine, triisodecylamine, tri-n-dodecylamine, tri-isododecylamine, and mixtures thereof, are particularly preferred due to their low chemical reactivity. Suitable strong acids for amine salt formation are particularly mineral acids, such as phosphoric acid, nitric acid, hydrochloric acid or sulfuric acid, above all hydrochloric acid or sulfuric acid.

The amine salt forms rapidly and quantitatively on mixing the water-insoluble amine with an acid waste water, the acid transferring from the aqueous phase into the organic phase with ion pair formation. The equilibrium of this "neutralisation" is far over towards the amine salt. The equilibrium constants are $10^4$ to $10^8$, depending on the amine and the acid. Amine salts of this type have the composition $(RH_2NH)X$, $(R_2HNH)X$ or $(R_3NH)X$, where X is the anion of the acid.

If the amine salts are prepared separately, they can be added to the waste water in undiluted form, but may alternatively, in order to reduce the viscosity, be diluted with an organic solvent, for example a hydrocarbon. Partial conversion of the amine into the amine salt is also possible, the remaining (free) amine acting as the diluent. In the case of in-situ formation of the amine salts, an organic solvent may analogously be present.

Halogenated hydroxyaromatics of the general formula (I) can be removed using the amine salts mentioned:

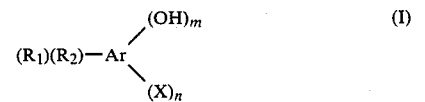

In the formula (I), X denotes fluorine, chlorine, bromine or iodine; $R_1$ and $R_2$ denote hydrogen, $C_1$-$C_4$-alkyl radical, a phenyl radical, a halo-$C_1$-$C_4$-alkyl radical, a halophenyl radical, a $C_1$-$C_4$-alkoxy radical or a phenoxy radical, with or without halogen substituents; Ar denotes a phenyl or naphthyl radical, preferably a phenyl radical; m and n are numbers from 1 to 5 in the case of the phenyl radical, or 1 to 8 in the case of the naphthyl radical.

The concentration in the aqueous phase of the halogenated hydroaromatics to be extracted may extend up to the saturation concentration. It is also possible for the aqueous solutions to contain other dissolved organic or inorganic compounds and suspended particles, so long as these do not interfere with the extraction. The process also permits extraction of halogenated hydroxyaromatics from very dilute solutions.

The great advantage of the process according to the invention is not only its broad range of application, but also, above all, its extremely high purifying action, which is expressed in distribution coefficients of, in some cases, above 1000. It is thereby possible to purify contaminated waste water to a few ppm or below into the ppb range in only one step, i.e. by simply stirring once with the extractant. However, the extraction cost is so low not only because of the one-step procedure, but also because the high extraction capacity allows the use of very small amounts of extractant, meaning that the waste water: extractant phase volume ratio can be set up to 20:1. Even higher values are possible if a multi-step procedure is used. The single-step extraction can be carried out batchwise or (more advantageously) continuously. If the extraction is carried out in several steps in crosscurrent or continuously in countercurrent, the ppb region is achieved without difficulties even in the case of relatively high concentrations of halogenated hydroxy-aromatics in the waste water.

In the case of mineral acid-containing waste water, a further advantage of the process according to the invention, besides removal of halogenated hydroxyaromatics, is removal of mineral acid, which is transferred into the amine phase from the waste water with formation of the extraction-active amine salts.

A further advantage of the process according to the invention is the possibility of simple recovery of the amine from the extract by one-step back-extraction with sodium hydroxide solution. During this procedure, the halogenated hydroxyaromatics, together with the mineral acid bound to the amine, are transferred quantitatively, as sodium salts, into the aqueous NaOH phase, while the free amine remains in the organic phase and can be fed back into the waste water extraction. Amine recovery can be achieved in one step, likewise by simple stirring, if an amount of NaOH which is equivalent to the content of mineral acid+hydroxyaromatic is employed. Concentrated sodium hydroxide solution is preferably used in an equivalent amount since, in this case, a particularly high concentration of halogenated hydroxyaromatics is achieved in the back extract. After enrichment in the back extract, which may be one to two powers of ten, the halogenated hydroxyaromatics can be recovered, either as salts or, after acidification, in the hydroxyl form, and the majority of them precipitate out and can be filtered off. In this way, a virtually loss-free procedure is ensured.

The invention is to be illustrated with reference to the examples below. The extractions in these examples were always carried out at room temperature. The name Hostarex A (a registered trademark in the FRG) denotes, with the number 327, a mixture comprising equal parts of tri-n-octylamine and tri-n-decylamine, and with the number 324 denotes tri-iso-octylamine.

COMPARATIVE EXAMPLE 1000 ml of an aqueous solution of 0.0401 mmol of 2-chlorophenol/g (corresponds to 0.5% by weight) were mixed vigorously in a stirred vessel with 100 ml of Hostarex A 27 (80.6 g), the mixture was brought to equilibrium, and the phases were then separated and analysed. The aqueous phase (raffinate) (993 g) had a concentration of 0.0041 mmol of 2-chlorophenol/g (527 ppm), and the extract phase (Hostarex A 327) (88.8 g) had a concentration of 0.4048 mmol of 2-chlorophenol/g. This corresponds to a distribution coefficient ($C_D$=concentration in the extract phase: concentration in the raffinate phase) of 98.7 and a degree of extraction of 89.8%.

EXAMPLE 1

1000 ml of the same aqueous solution containing 0.0401 mmol of 2-chlorophenol/g (0.5% by weight) as in the comparative example were brought to equilibrium by vigorous mixing with 100 ml (86.8 g) of Hostarex A 327 as the hydrochloride (comprising 79.5 g of Hostarex A 327 and 7.3 g of hydrogen chloride). After phase separation, the aqueous phase (990 g) only contained 0.0002 mmol of 2-chlorophenol/g (25 ppm), and the organic phase (86.8 g) contained 0.46 mmol of 2-chlorophenol/g (5.91% by weight). The distribution coefficient ($C_D$) ws now 2300, and the degree of extraction 99.5%.

EXAMPLE 2

1000 ml of an aqueous solution containing 0.0401 mmol of 4-chlorophenol (0.5% by weight) were brought to equilibrium by vigorous mixing with 100 ml (86.7 g) of Hostarex A 324 as the hydrochloride (comprising 78.8 g of Hostarex A 324 and 7.9 g of hydrogen chloride. After phase separation, the aqueous phase (991 g) still contained 0.0004 mmol of 4-chlorophenol/g (50 ppm), and the organic phase (87.8 g) contained 0.452 mmol of 4-chlorophenol/g (5.81% by weight). The distribution coefficient ($C_D$) was 1130 and the degree of extraction 99.0%.

EXAMPLE 3

1000 ml of an aqueous solution containing 0.0317 mmol of 2,4-dichlorophenol/g (0.52% by weight) was brought to equilibrium by vigorous stirring with 100 ml (86.8 g) of Hostarex A 327 as the hydrochloride. After phase separation, the aqueous phase (998 g) still contained 0.0003 mmol/g (49 ppm) of 2,4-dichlorophenol, and the extract phase (99 g) contained 0.317 mmol/g (5.17% by weight). This corresponds to a distribution coefficient ($C_D$) of 1056 and a degree of extraction of 99.1%.

EXAMPLE 4

100 g of Hostarex A 327 were brought into contact with 44.35 ml of 4 N sulfuric acid by vigorous stirring. During this procedure, the sulfuric acid was transferred quantitatively from the aqueous phase into the organic amine phase, meaning that 70% of the latter was converted into the amine sulfate (($R_3NH$)$_2SO_4$). After separation of the aqueous phase, this amine sulfate/amine mixture was employed as an extractant for removing 2,6-dichlorophenol (0.0125 mmol/g, i.e. 0.20% by weight) from 1000 ml of aqueous solution. The aqueous raffinate (998 g) only had a 2,6-dichlorophenol concentration of 0.0001 mmol/g (i.e. 16 ppm), and the organic extract (123 g) contained 0.10 mmol/g (i.e. 1.3% by weight). This corresponds to a distribution coefficient ($C_D$) of 1000 and a degree of extraction of 99.2%.

EXAMPLE 5

1000 ml of an aqueous solution containing 860 ppm of 2,4,5-trichlorophenol was brought to equilibrium by vigorous mixing with 100 ml (86.8 g) of Hostarex A 327 as the hydrochloride. The aqueous raffinate still contained 0.12 ppm and the extract 0.99% by weight of 2,4,5-trichlorophenol. This corresponds to a distribution coefficient ($C_D$) of 82500 and a degree of extraction of 99.99%.

EXAMPLE 6

1000 ml of an aqueous solution containing 410 ppm of 2,4,6-trichlorophenol were brought to equilibrium by vigorous mixing with 100 ml (86.8 g) of Hostarex A 327 as the hydrochloride. The aqueous raffinate still contained 0.13 ppm, and the extract 0.47% by weight of 2,4,6-trichlorophenol. This corresponds to a distribution coefficient ($C_D$) of 36150 and a degree of extraction of 99.97%. After phase separation, the extract was back-extracted in one step by stirring with 42 g of 20% strength sodium hydroxide solution. During this procedure, the 2,4,6-trichlorophenol and the hydrochloric acid bound to the amine were transferred completely as the Na salts into the sodium hydroxide solution, while the regenerated and purified Hostarex A 327, after conversion into the hydrochloride, was fed back into the extraction.

EXAMPLE 7

1000 ml of a waste water containing 10 ppm of pentachlorophenol were mixed vigorously with 65 ml (56.4 g) of Hostarex A 327 as the hydrochloride and brought to equilibrium.

The aqueous raffinate still contained 0.015 ppm of pentachlorophenol, and the extract contained 172 ppm of pentachlorophenol. This corresponds to a distribution coefficient ($C_D$) of 11460 and a degree of extraction of 99.85%.

EXAMPLE 8

1000 ml of an aqueous solution containing 0.490% by weight of 2-fluorophenol were brought to equilibrium, in corresponding fashion to example 1, with 100 ml of Hostarex A 327 as the hydrochloride. After phase separation, the aqueous phase (990 g) still contained 97 ppm of fluorophenol, and the organic phase (86.7 g) contained 5.54% by weight. The distribution coefficient ($C_D$) was 570, and the degree of extraction 98.0%.

EXAMPLE 9

1000 ml of an aqueous solution containing 0.15% by weight of 2,4-dichloro-6-methylphenol was brought to equilibrium, in corresponding manner to Example 1, with 100 ml of Hostarex A 327 as the hydrochloride. After phase separation, the aqueous phase (990 g) still contained only 15 ppm of 2,4-dichloro-6-methylphenol and the organic phase (86.6 g) contained 1.715% by weight. The distribution coefficient ($C_D$) was 1140 and the degree of extraction 99.0%.

EXAMPLE 10

1000 ml of an aqueous solution containing 0.2% by weight of 2-chlorophenol were brought to equilibrium with 200 ml of a solution containing 40% by weight of Hostarex A 324 as the hydrochloride and 60% by weight of Solvesso ® 150 (commercially available mixture of $C_{10}$–$C_{11}$-alkylbenzenes) as solvent. After phase separation, the aqueous phase (995 g) still contained 18 ppm of 2-chlorophenol, and the organic phase (170 g) contained 1.166% by weight of 2-chlorophenol. The distribution coefficient ($C_D$) was 648 and the degree of extraction 99.1%.

We claim:

1. A process for extracting at least one halogenated hydroxyaromatic compound from aqueous solution with an extractant, wherein:
said halogenated hydroxyaromatic compound has the general formula

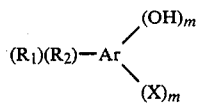

in which
X denotes fluorine, chlorine, bromine, or iodine;
$R_1$ and $R_2$ denote hydrogen, a $C_1$–$C_4$ alkyl radical, a phenyl radical, a halo-$C_1$–$C_4$-alkyl radical, a halophenyl radical, a $C_1$–$C_4$-alkoxy radical or a phenoxy radical, with or without halogen substituents;
Ar denotes a phenyl or naphthyl radical;
m and n are numbers from 1 to 5, in the case of the phenyl radicals, or 1 to 8 in the case of the naphthyl radical;
and wherein the extractant consists essentially of the amine salt reaction product of the components comprising an aliphatic amine having a total carbon number of 10 to 75 and a strong acid.

2. The process as claimed in claim 1, wherein Ar denotes a phenyl radical.

3. The process as claimed in claim 2, wherein X denotes fluorine or chlorine.

4. The process as claimed in claim 1, wherein the extractant is undiluted or is diluted with an organic solvent.

5. The process as claimed in claim 1, wherein the amine salt reaction product is a compound of the formula

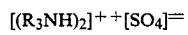

or

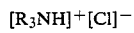

wherein R is a straight-chain, cyclic, or branched aliphatic group selected such that the total number of carbon atoms in the compound is from 20 to 50.

6. The process as claimed in claim 1, wherein the amine salt reaction product is the product of a water-insoluble tertiary amine and a mineral acid.

7. The process as claimed in claim 6, wherein the mineral acid is phosphoric, nitric, hydrochloric, or sulfuric acid.

8. The process as claimed in claim 6, wherein the aqueous solution comprises a mineral acid-containing waste water, and the amine salt reaction product is formed at least partly in situ by reaction of the mineral acid with a said water-insoluble tertiary amine.

9. The process as claimed in claim 1, wherein an aqueous solution containing a said halogenated hydroxyaromatic compound is mixed with the amine salt reaction product, and the resulting mixture is permitted to separate into an aqueous phase and an organic phase, the halogenated hydroxyaromatic compound being extracted into the organic phase.

10. The process as claimed in claim 1, wherein the extraction is carried out by mixing the aqueous solution with the extractant at a temperature below the distillation temperature of said halogenated hydroxyaromatic compound.

11. The process as claimed in claim 10, wherein said extraction is carried out at room temperature.

12. The process as claimed in claim 1, wherein the amine salt reaction product is derived from a tertiary amine.

13. The process as claimed in claim 1, wherein the amine salt reaction product is derived from a said aliphatic amine and hydrochloric or sulfuric acid.

* * * * *